Oct. 23, 1951     C. H. ROWLAND     2,572,202
GARDEN TRACTOR

Filed Sept. 7, 1948     3 Sheets-Sheet 1

Inventor
Charles H. Rowland
by Frederick C. Bromley
ATTY.

Oct. 23, 1951 — C. H. ROWLAND — 2,572,202
GARDEN TRACTOR
Filed Sept. 7, 1948 — 3 Sheets-Sheet 2

Inventor
Charles H. Rowland
by Frederick E. Bromley
ATTY

Oct. 23, 1951  C. H. ROWLAND  2,572,202
GARDEN TRACTOR

Filed Sept. 7, 1948  3 Sheets-Sheet 3

Inventor
Charles H. Rowland
by Frederick C. Bromley
ATTY.

Patented Oct. 23, 1951

2,572,202

UNITED STATES PATENT OFFICE 2,572,202

GARDEN TRACTOR

Charles H. Rowland, Port Perry, Ontario, Canada, assignor of one-half to Milton J. Goode, Port Perry, Ontario, Canada Application September 7, 1948, Serial No. 48,109

17 Claims. (Cl. 97—48)

My invention relates to improvements in garden tractors of the walking type and has for a general object to provide a machine of this kind which is easy to handle and to which various implements may be attached for performing cultivating operations and doing other work for which a tractor is customarily used.

Another object is to provide a tractor with a wheeled frame comprising a traction wheel mounted on a fork which is swingable rearwardly to lift an attached implement from the ground, the fork being provided with a control device by which it is manually shiftable.

Another object is to provide a tractor structure as referred to in which the traction wheel has a transmission connection with an engine mounted on the machine frame including a belt drive so arranged that the belt is slackened to disconnect the drive when the fork is rearwardly swung away from its regular position in which the implement is in lowered condition.

Still another object is to provide in such a machine a contrivance for mounting an implement on the fork including a hitch device rigid with the fork and an attachment detachably connected thereto for connection of the implement. A distinctive feature of the attachment device is that it comprises a draft member which is tiltably mounted and connected to a brace device for automatically tilting the draft member, when the fork is rearwardly swung, so as to increase the rise of the implement.

Another object is to furnish a tractor as referred to in which the welded frame comprises casters at its rear that enable it to be steered with facility by means of handle bars attached to the frame.

With these and other objects in view the invention essentially comprises the novel construction and arrangement of parts as hereinafter more fully described and illustrated in the embodiment shown in the accompanying drawings in which.

Figure 1:
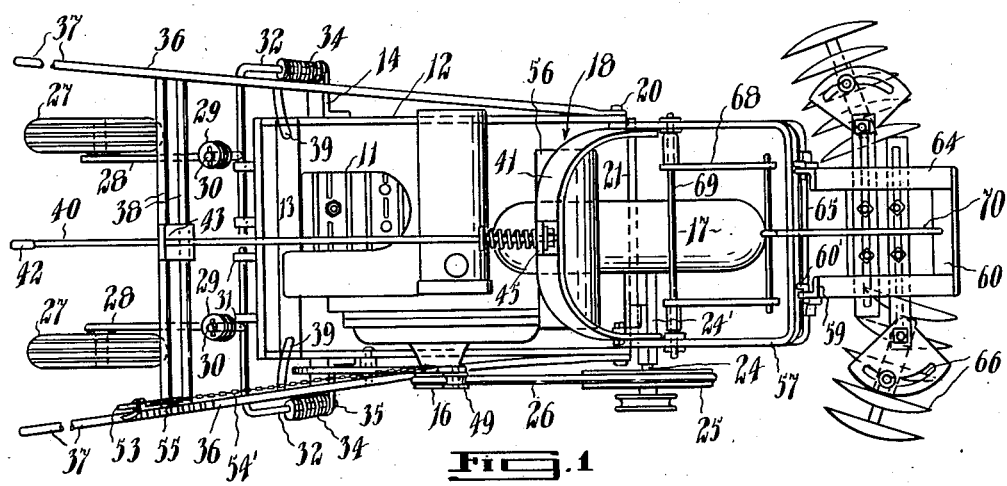
Fig. 1 is a plan view of the tractor showing a disc harrow attached thereto.

The embodiment of the invention herein illustrated comprises the frame 10 of the tractor, which frame is a longitudinal member of an approved construction to constitute a chassis for support of a power plant 11. Said frame is shown as made up of the side bars 12, the intermediate crossbars 13 and the rear crossbar 14. These components are rigidly tied together to form a rigid structure having an open front end.

The power plant 11 is a conventional internal combustion engine, which is rigidly mounted on the frame 10 as by means of said intermediate crossbars 13 with the power take-off shaft 15 disposed transversely of the frame and supplied with a fixed pulley 16.

The front end of the frame is supported by the large traction wheel 17 which is mounted in the fork 18. The fork extends upwardly from the frame and has the lower ends of its side bars 19 pivoted at 20 to the front ends of the frame members 12 so as to be capable of swinging longitudinally of the frame from its lower end.

Said traction wheel is journalled in the fork at a point removed from the pivotal connections 20 as by a dead axle 21 and held centrally of the fork in approved manner. The traction wheel is supplied with an internal ring gear 22 secured to a side thereof concentric with its axle. The ring gear is in constant mesh with a pinion 23 keyed or otherwise secured to a driven shaft 24 journalled in the fork as by a bracket 24' from which the shaft protrudes. On the protruding end of shaft 24 a pulley 25 is fixed in alignment with said pulley 16. The pulleys 16 and 25 are connected by a belt 26. The belt is tight when the fork 18 is in a normal erectile position as clearly shown in Figure 3. Manually operable means is provided to retain the fork in this position and to move the fork to loosen the belt, which means will be recounted later on.

The rear of said frame 18 is supported by a pair of casters, one at or near each side thereof. Each caster comprises a land wheel 27 journalled on the distal end of a rearwardly extending arm 28 which has its forward end connected by a knuckle joint 29 to an upturned post 30 horizontally pivoted in lugs 31 and provided with a radial arm 32. The knuckle joint enables the arm 28 to swing from side to side in guiding and turning the tractor. Preferably the axis of the knuckle joint is slightly inclined from the vertical in rearward direction in order to facilitate turning the tractor from one side or the other. A resilient suspension is incorporated in the caster mounting by providing the radial arm 32 with a downwardly bent end 33 curved through its length and encircled by a coil spring 34 of the compression type which is seated at one end on the bent portion of this arm and oppositely seated at its other end on a saddle 35 secured to the adjacent side bar 12 of the frame. The spring suspension cushions the wheeled frame in passing over rough ground.

The wheeled frame is guided manually through the provision of spaced handle bars 36 fastened to the forward ends of the side bars 12 and extended upwardly and rearwardly therefrom to terminate in grips 37. The grip ends are joined by cross pieces 38 and at the rear end of the wheeled frame the handle bars are braced by brace bars 39. Accordingly, the handle bars can be conveniently grasped by the operator in order to guide and control the tractor when walking behind it.

From the foregoing it will be evident that the engine will transmit power to the traction wheel as long as the belt is tight. Rearward movement of the fork 18 shifts the pulley 25 with a resulting slackening of the belt 26 and a consequent disconnection of the drive.

The manually operable means for retaining the fork in set position and shifting it is shown as comprising a shift rod 40 connected to the bight 41 of the fork and extended rearwardly to terminate in a handle 42 transversely disposed so that it may be used to impart a turning movement to the rod as well as to move it endwise. Said rod is rearwardly supported by a bearing plate 43 on the cross pieces 38. Said shift rod is passed through an aperture 44 in said bearing plate for endwise movement and when so moved it swings the fork 18 about the pivots 20. The connection with the fork is such as to enable the shift rod to turn about its longitudinal axis, which connection is shown as comprising an apertured plate 45 on the bight 41 of the fork through which the shift rod freely extends and is shouldered at its forward end by a nut 46. A compression spring 47 of the helical type is used at the opposite side of plate 45 to act as a buffer for absorbing impacts imparted to the fork when the traction wheel strikes an obstruction. Spring 47 is seated against the plate 45 and shouldered on the rod as by a collar.

Figures 8, 9:
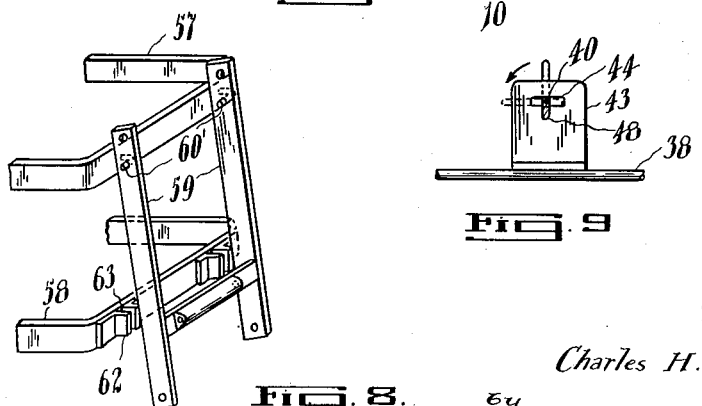
Fig. 8 is a perspective view depicting the manner of applying the attachment device to the hitch device.
Fig. 9 is a cross section on line 9—9 of Fig. 7.

The aperture 44 is transversely elongated in the bearing plate 43, as will best be seen from an inspection of Fig. 9. On the portion of the shift rod that extends through aperture 44 there is provided a longitudinal arrangement of lateral fingers 48 separated by interdigital spaces or notches. These fingers pass freely through the aperture when the shift rod is turned to bring them into alignment therewith. In this position the shift rod may be moved endwise for positional change of the fork 18. By turning the shift rod away from this angular position and engaging an interdigital space with the bearing plate the shift rod is locked against endwise movement and the fork is thus secured against movement. According to this construction the shift rod is operable to swing the fork to tighten and loosen the belt 26 and also to retain the fork in set position.

Independently of the shift rod control for the fork the belt is provided with a common type of tightener, which tightener is shown as comprising the idler 49 engaged with the belt and carried by an arm 50 pivoted at 51 on the frame 10 and tensioned by a spring 52.

Said belt tightener is controlled by a lever device for disconnecting the drive to the traction wheel. The lever device is preferably in the nature of a hand lever 53 pivoted at 54 on one of the handle bars 36 and connected to the arm 50 as by a flexible element 54'. A quadrant 55 is associated with the hand lever to hold it in different positions to which it may be set, and said hand lever is provided with an ordinary latching device. The fork may be weighted to aid in securing traction. Such a weight is indicated at 56.

Said fork is supplied with a hitch device for attachment of an implement at the front of the traction wheel, as shown in the drawings. Said hitch device comprises an upper hitch bar 57 and a lower hitch bar 58, both being U-shaped members and each extending forwardly of the traction wheel and having their leg portions rigidly secured to the side bars 19 of the fork.

A special attachment device is employed to connect an implement to the hitch device. This attachment device comprises a pair of connector bars 59 arranged vertically at the front end of the hitch bars 57, 58, and carrying a draft member 60. The connector bars 59 are provided with means by which the attachment device can be readily applied to the hitch device and removed therefrom in the use of the tractor for performing various cultivating operations and other work for which it is suited.

Said means for connecting the attachment device to the hitch device preferably comprises hooks 60' rigid with the bight element of the upper hitch bar 57 and horizontally arranged with their ends pointing in the same direction so that they may engage in apertures provided in the upper ends of said connector bars 59. Spaced lugs 62 are provided on the bight portion of the lower hitch bar 58 to supply slots 63 in alignment with the hooks 60'. These slots receive the lower ends of said connector bars.

To apply the attachment device it is only necessary to engage the connector bars as a unit on the hooks 60' and then engage them in the slots 63. The connector bars can be readily removed by a reverse procedure.

Figure 2:
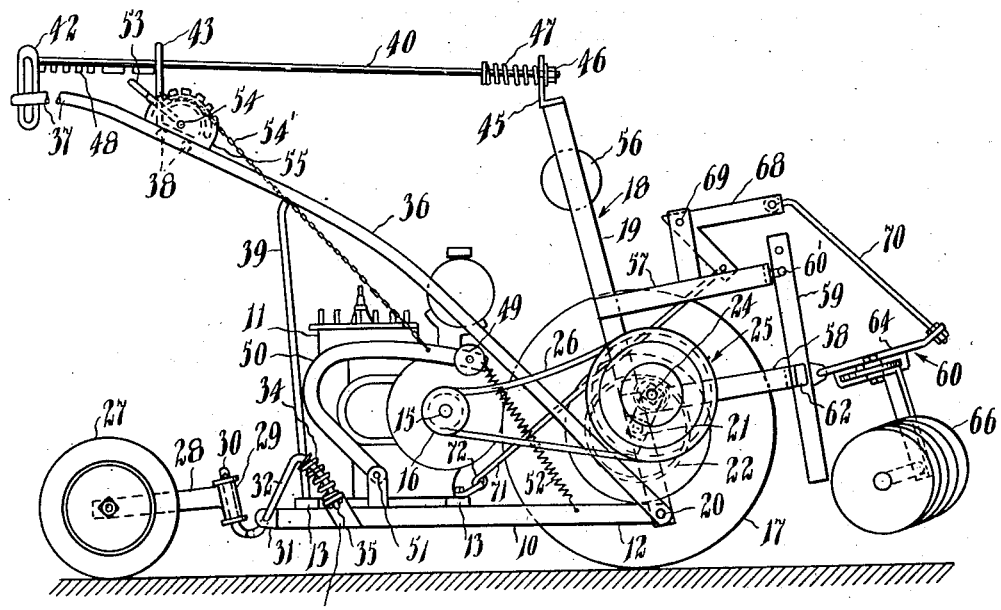
Fig. 2 is a side elevation thereof in which the fork is shown in its rearwardly swung position with the implement lifted.
Figure 3:
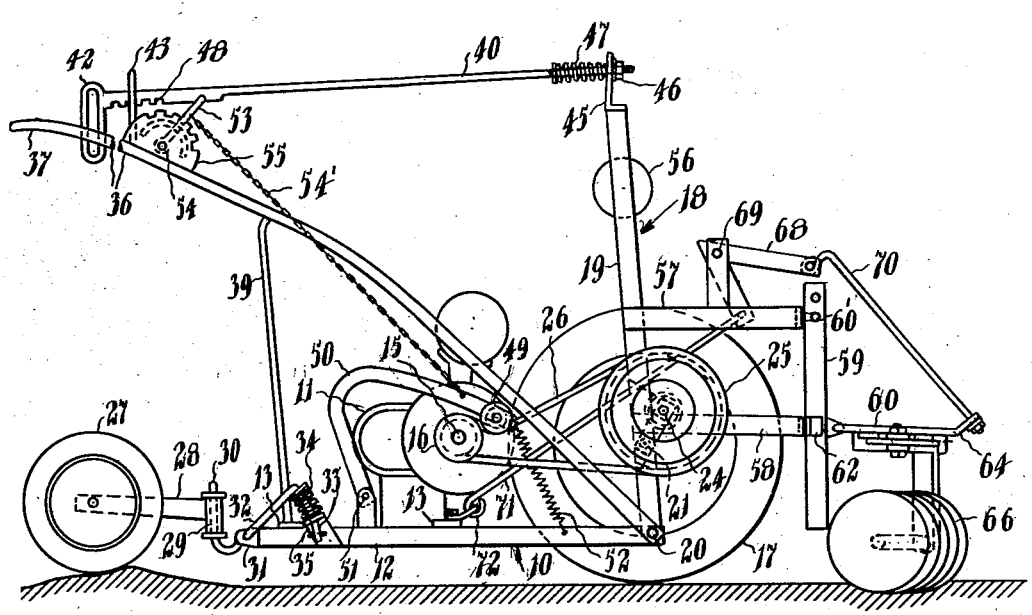
Fig. 3 is a similar view but showing the fork in its regular position in which the implement is lowered.
Figures 4, 5:
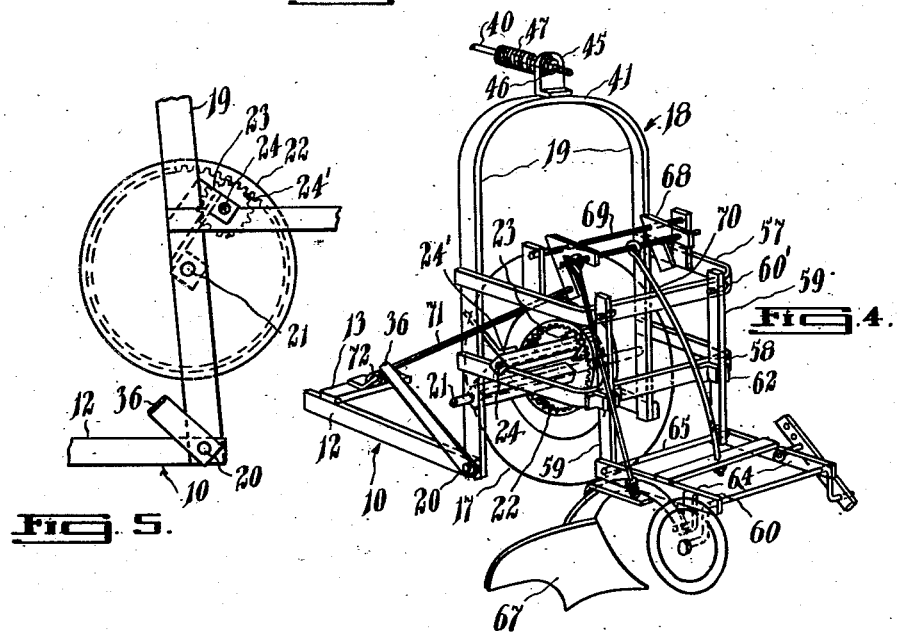
Fig. 4 is a perspective view of the fork end of the machine. In this view there is shown a plow on the tractor in lieu of the disc harrow.
Fig. 5 is a fragmentary view showing the gearing on the fork for the traction wheel.
Figure 6:
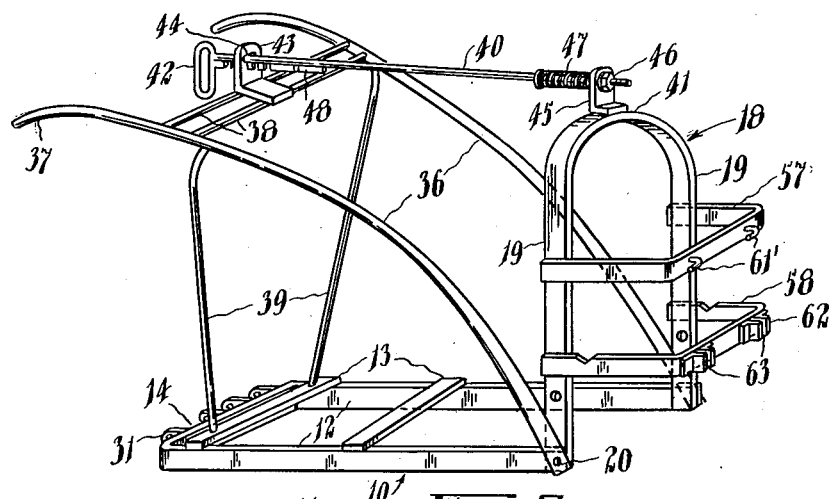
Figs. 6 and 7 are perspective views of the frame showing the fork in forward and rearward positions respectively.
Figure 7:
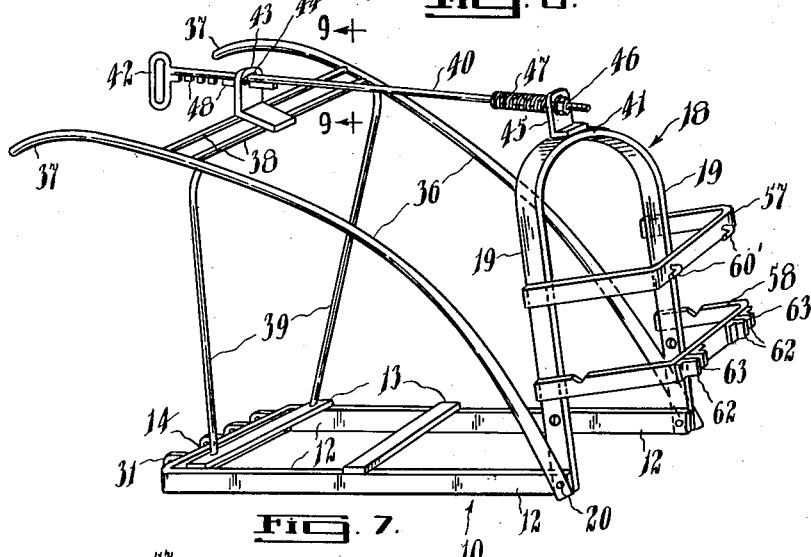

The draft member 60 is a horizontal frame composed of united bars including side members 64 extending forwardly of the hitch device and pivoted rearwardly as by a pintle 65 to the lower ends of the connector bars 59 to swing upwardly. An implement is secured to the draft member for traversing the ground in front of the tractor. In Figs. 1, 2 and 3 the implement is shown as a disc harrow 66 having two gangs of discs which are adjustably arranged at the sides of the attachment device. The disc harrow is shown by way of example but not of limitation as it will be manifest that other implements may be used in lieu thereof, such as for instance the plow 67 depicted in Fig. 4. Such other implements may include a lawn mower, not shown. The attachment device may be constructed to that it may be used for one or more implements, but on the other hand interchangeable attachment devices may be provided, each for a different implement.

A brace or like supporting means may be employed to render the draft member 60 immovable relative to the hitch when the attached implement is in operation. Preferably the brace or like supporting means is constructed to tilt the draft member when the fork 18 is being swung rearwardly to raise the implement out of working engagement with the ground. By imparting such a tilt to the draft member the elevational movement of the implement is increased so that only a fairly short rearward movement of the fork is required in order to raise the implement clear of the ground.

The illustrated embodiment of the supporting device for the draft member comprises a bellcrank 68 pivoted at 69 on the upper hitch bar 57 and having one of its arms pivoted to a connecting rod 70 and the other arm thereof pivoted to a push rod 71. The push rod is swingably connected at 72 to the frame 10, whereas the connecting rod 70 is attached to the forward end of the draft member. It follows from this construction that as the fork is swung rearwardly to lift the implement the push rod 71 acts in conjunction with the bellcrank to tilt the draft member which increases the lift of implement in a compound lifting action.

An important feature of my invention as above recounted is that the drive to the traction wheel may be disconnected by the manually operable belt tightener which has the advantage that the implement remains in or on the ground as the case may be. Another distinctive feature is that rearward swing of the fork serves not only to disconnect the drive to the traction wheel but to also lift the implement from the ground. Reverse swing of the fork operates to connect the drive to the traction wheel by tightening the belt and at the same time lowers the implement. Accordingly my invention provides a highly serviceable tractor for use in gardening work, and one which is easy for an operator to manipulate. The structure of the wheeled frame makes the tractor readily maneuverable so that turns can be made with little effort on the part of the operator. Consequently the tractor can be handled with a minimum of fatigue. By spreading the caster wheels when the machine is at rest it is rendered quite stable.

What I claim is:

1. A tractor comprising a wheeled frame, a fork pivoted on said frame to upstand therefrom for swinging away from the vertical in a longitudinal direction with respect to said frame, manually operable means for retaining said fork in set position and for swinging it to different positions, a hitch device on said fork, an attachment device for an implement, and means for detachably securing said attachment device on said hitch device, said last mentioned means comprising hooks on said hitch device, connecting bars forming a part of said attachment device and vertically arranged, said connecting bars having apertures receptive to said hooks, and lugs on said hitch device, said lugs forming slots in alignment with said connecting bars and being receptive thereto and spaced below said hooks.

2. A tractor comprising a wheeled frame including a traction wheel at an end thereof, a fork having a pivotal connection with said frame to upstand therefrom for swinging away from the vertical in a longitudinal direction with respect to said frame, said traction wheel being journalled on said fork at a point above said pivotal connection, an engine mounted on said wheeled frame, a transmission forming a driving connection between said engine and said traction wheel and including a disconnecting device which functions to disconnect the drive to the traction wheel when said fork is swung away from the vertical, manual means for retaining said fork in set position and for swinging it away from such position, and a hitch on said fork for supporting an implement beyond said traction wheel in the longitudinal extent of said frame for tilting upwardly to raise the implement when said fork is swung away from said set position.

3. A tractor as defined in claim 2, in which the traction wheel is located at the front end of the wheeled frame, and in which the wheeled frame is supported at its rear end on casters.

4. A tractor as defined in claim 2, in which the wheeled frame is provided with a handle bar at its rear end, the traction wheel being located at the front end; and in which the rear end of the wheeled frame is supported by swivelled wheels incorporating a spring suspension.

5. A tractor comprising a wheeled frame including a traction wheel at an end thereof, a fork having a pivotal connection with said frame to upstand therefrom for swinging away from the vertical in a longitudinal direction with respect to said frame, said traction wheel being journalled on said fork at a point above said pivotal connection, an engine mounted on said wheeled frame including a power take-off pulley, a pulley mounted on said fork and spaced from the pivotal axis thereof so as to be bodily displaced by said movement of said fork, a belt connecting said pulleys, said belt being tight in the upstanding position of said fork and being slackened by said movement of the fork to disconnect the drive, gearing connecting said pulley on the fork to said traction wheel, manual means for retaining said fork in set position and for swinging it away from such position, and a cantilever implement support carried by said fork for tilting upwardly as the fork is swung away from the vertical in order to raise the implement.

6. A tractor comprising a frame, swivel wheels supporting the rear end of said frame, a fork pivoted on the front end of said frame and extended upwardly for swinging longitudinally thereof, a traction wheel mounted on said fork on an axis located upwardly of the pivotal connection thereof, a pulley on said fork having a driving connection with said traction wheel and spaced from said pivotal connection, an engine mounted on said frame, a driven pulley supported on said engine rearwardly of said fork and aligned with said first mentioned pulley, a belt engaged with said pulleys, a hitch device for supporting an implement on the fork forwardly of the traction wheel, a rearwardly disposed handle device for guiding said frame, and a manually operable device for securing the fork in set position and for swinging it rearward so as to elevate the implement and to slacken said belt for simultaneously disconnecting the drive to the traction wheel.

7. A tractor comprising a wheeled frame including a traction wheel at an end thereof, a fork having a pivotal connection with said frame to upstand therefrom for swinging away from the vertical in a longitudinal direction with respect to said frame, said traction wheel being journalled on said fork at a point above said pivotal connection, an engine mounted on said wheeled frame, a transmission forming a driving connection between said traction wheel and said engine, said transmission including a belt drive having a pulley mounted on said fork so as to be displaced by movement thereof in order to loosen the belt for disconnecting the drive, manual means for retaining said fork in set position and for swinging it away from such position, and a hitch device for supporting an implement on the fork, said hitch device extending from said fork oppositely to said engine to tilt upwardly for elevating the implement when the fork is moved to disconnect said drive.

8. A tractor as defined in claim 7, in which the fork is disposed at the front end of the frame in advance of the engine, and in which the belt drive includes a pulley on the engine shaft for the belt, whereby the belt is loosened by rearward movement of said fork.

9. A tractor as defined in claim 7, in which the pulley is mounted on the fork in offset relation to the axis of the traction wheel and is connected to the traction wheel by a pinion in mesh with an internal ring gear.

10. A tractor comprising a wheeled frame including a traction wheel at an end thereof, a fork having a pivotal connection with said frame to upstand therefrom for swinging away from the vertical in a longitudinal direction with respect to said frame, said traction wheel being journalled on said fork at a point above said pivotal connection, an engine mounted on said wheeled frame, a transmission forming a driving connection between said traction wheel and said engine, a shift rod connected to said fork, means adjustably connecting said shift rod to said frame, and a lift mechanism for supporting an implement on said fork and extending longitudinally of the frame to tilt upwardly to elevate the implement when said fork is swung away from an erect position.

11. A tractor comprising a wheeled frame including a traction wheel at an end thereof, a fork having a pivotal connection with said frame to upstand therefrom for swinging away from the vertical in a longitudinal direction with respect to said frame, said traction wheel being journalled on said fork at a point above said pivotal connection, an engine mounted on said wheeled frame, a transmission forming a driving connection between said traction wheel and said engine, manual means for retaining said fork in set position and for swinging it away therefrom, and a lift device carried by said fork for supporting an implement in front of said traction wheel and for tilting upwardly to raise the implement when the fork is swung backwardly.

12. A tractor as defined in claim 11, in which the lift device comprising a hitch device forwardly extending from said fork, an attachment device for connection to the implement, and means for detachably securing said attachment device on said hitch device, said means comprising hooks on said hitch device, connecting bars forming a part of said attachment device and vertically arranged, said connecting bars having apertures receptive to said hooks, and lugs on said hitch device, said lugs forming slots in alignment with said connecting bars and being receptive thereto and spaced below said hooks.

13. A tractor as defined in claim 11, in which the lift device comprises a hitch device secured to the fork, an attachment device pivoted thereto for connection to the implement and a rod mechanism connecting said attachment device to said wheeled frame and arranged to utilize the back swing of said fork to cause an upswing of the attachment device on its pivot for increasing the elevational movement of the implement.

14. In combination, a tractor having a wheeled frame, a fork pivoted on said frame to swing from a normal position to a backward position, manually operable means for swinging said fork to either of said positions and retaining it thereat, a hitch device mounted on said fork to extend forwardly thereof, an implement supporting device pivotally mounted on said hitch device to swing upwardly to elevate the implement, and a mechanism for causing an upswing of the supporting device on its pivotal mounting in the back swing of the said fork, said mechanism including a rod connected to said wheeled frame at a point spaced from the pivot of said fork and arranged to exert a pushing force on said implement supporting device.

15. A structure as defined in claim 14, and in which the said mechanism comprises a bellcrank mounted on the hitch device and connected to the said rod, and in which said bellcrank is also connected to said implement supporting device.

16. A tractor comprising a wheeled frame, a fork pivoted on said frame to upstand therefrom for swinging away from the vertical in a longitudinal direction with respect to said frame, manually operable means for retaining said fork in set position and for swinging it to different positions, a hitch device on said fork, an attachment device for an implement, said attachment device comprising an implement support mounted to tilt relative to said hitch device, and a bellcrank connection with said wheeled frame by which said implement support is caused to tilt upwardly as said fork is swung to raise the implement.

17. A tractor comprising a wheeled, frame, a fork pivoted on said frame to upstand therefrom for swinging away from the vertical in a longitudinal direction with respect to said frame, manually operable means for retaining said fork in set position and for swinging it to different positions, a hitch device on said fork, an attachment device for an implement, said attachment device comprising a draft member supported to tilt relative to said hitch device, a bellcrank on said hitch device, a connecting rod forming a connection between said draft member and an arm of said bellcrank, and a push rod linking the other arm of said bellcrank to said wheeled frame.

CHARLES H. ROWLAND.

REFERENCES CITED

The following references are of record in the file of this patent:

UNITED STATES PATENTS

| Number | Name | Date |
|---|---|---|
| 1,886,005 | Glasier | Nov. 1, 1932 |